United States Patent [19]

Fulmer

[11] Patent Number: 4,674,541
[45] Date of Patent: Jun. 23, 1987

[54] MULTIPLE SEAL FOR A PRESSURE VESSEL

[75] Inventor: Keith H. Fulmer, Mishawaka, Ind.

[73] Assignee: Allied Corporation, Morristown, N.J.

[21] Appl. No.: 871,947

[22] Filed: Jun. 9, 1986

[51] Int. Cl.⁴ ............................................. F16L 55/04
[52] U.S. Cl. ....................................... 138/31; 251/351
[58] Field of Search .............................. 138/26, 30, 31; 251/351, 346

[56] References Cited

U.S. PATENT DOCUMENTS

| | | | |
|---|---|---|---|
| 1,423,418 | 7/1922 | Grikscheit | 251/346 |
| 3,420,273 | 1/1969 | Greer | 138/30 |
| 3,509,916 | 5/1970 | Mercier | 138/30 |
| 3,537,357 | 11/1970 | Packer | 138/31 |
| 3,601,358 | 8/1971 | Cruse | 251/351 |
| 3,930,521 | 1/1976 | Zahid | 138/30 |
| 4,291,726 | 9/1981 | Zahid | 138/30 |
| 4,307,748 | 12/1981 | Mathias | 251/351 |
| 4,445,530 | 5/1984 | Meixell | 251/351 |
| 4,470,577 | 9/1984 | Warwick | 251/351 |

Primary Examiner—Stephen Marcus
Assistant Examiner—Leo J. Peters
Attorney, Agent, or Firm—Larry J. Palguta; Ken C. Decker

[57] ABSTRACT

The pressure vessel comprises an accumulator (10) having a piston (16) disposed in a bore (14). The piston (16) has gas under pressure on one side thereof maintained within the bore (14) by means of a multiple seal in an opening (26) having first (28), second (32), and third diameter (36) sections. The multiple seal includes a fill screw (40) threadedly engaging the second diameter section (32) of the opening (26), the fill screw (40) having a conical surface (46) sealingly engaging a seat (31) between the first diameter (28) and second diameter (32) sections of the opening. A cap screw (70) is threadedly received within the third diameter section (36) and compresses an O-ring (60) between the cap screw (70) and housing (12). The cap screw (70) has an annular rib (77) which bites into a shoulder (34) of the body (12) to provide an additional seal for maintaining the gas under pressure within the bore (14).

12 Claims, 2 Drawing Figures

MULTIPLE SEAL FOR A PRESSURE VESSEL

This invention relates to a multiple seal for a pressure vessel, in particular for an accumulator.

Accumulators have been used for many years in automotive applications. An accumulator may be utilized in what is known in the art as a "full power" brake system wherein the accumulator provides hydraulic brake fluid under high pressure to the system as the pressure is needed. An automotive accumulator typically has a housing with a piston disposed in a bore, a gas under high pressure contained on one side of the piston and hydraulic brake fluid contained on the other side of the piston. The accumulator is charged by pumping the gas under high pressure through an opening and into the bore, and then the opening is sealed by a screw or other device. It is particularly important that a high integrity sealing mechanism be provided in the opening, because leakage or loss of the gas under pressure will disable the accumulator and adversely affect the full power braking system. The present invention provides a multiple seal for a pressure vessel, in particular for an accumulator, in order to insure a high integrity seal in the opening through which the gas under pressure is transmitted to the bore.

The present invention comprises a pressure vessel with a body having therein a bore, a medium under pressure contained within the bore, the body having an opening for the transmission of the medium therethrough, the opening having a stepped diameter comprising first, second, and third diameter sections, a first shoulder between the first and the second diameter sections forming a seat, a fill screw received within the second diameter section and extending to the first diameter section, the screw having an opening therethrough for transmission of said medium and an angled head which sealably engages the seat, a sealing ring disposed within the third diameter section and biased into engagement with the body by a cap screw threadably received within the third diameter section, the cap screw extending into engagement with a second shoulder disposed between the second and third diameter sections, the cap screw having at an end thereof an annular rib which engages sealingly the shoulder to prevent escape of said medium from the bore.

One way of carrying out the invention is described in detail below with reference to the drawings which illustrate an embodiment, in which.

Figure 1:
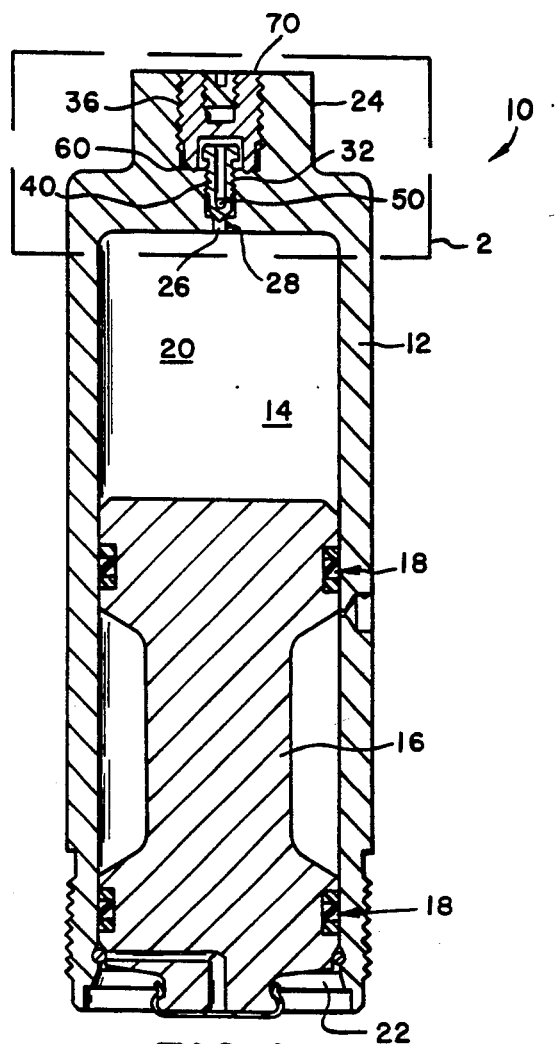
FIG. 1 is a section view of the pressure vessel of the present invention.
Figure 2:
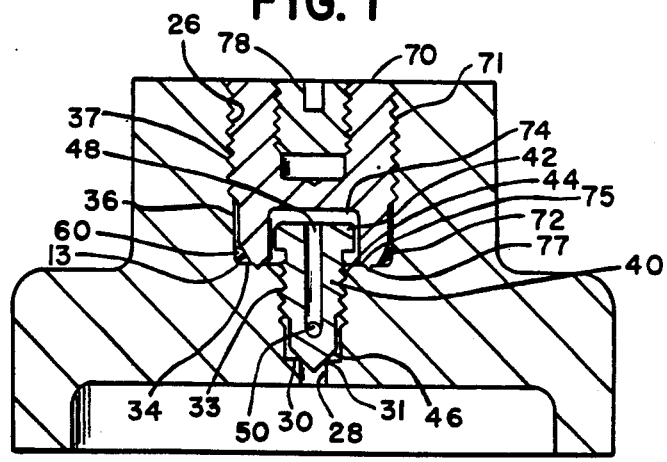
FIG. 2 is an enlarged view of a portion of FIG. 1.

The pressure vessel of the present invention is designated generally by reference numeral 10. The vessel 10 comprises an accumulator having a housing or body 12 which is made of aluminum, and has a bore 14 receiving therein a piston 16. Piston 16 has a plurality of seals 18 about each end in order to prevent intermixing of the fluids on each side of the piston. Piston 16 divides bore 14 into chambers 20 and 22. Typically, chamber 20 contains a gas under high pressure, for instance nitrogen. Chamber 22 includes therein hydraulic brake fluid. Housing 12 has an end 24 which includes a stepped diameter opening 26. Stepped diameter opening 26 comprises a small first diameter section 28 joined to second diameter section 32 by means of a first shoulder 30. Second diameter section 32 is joined to third diameter section 36 by means of second shoulder 34. At the interface between shoulder 30 and first diameter section 28 is a seat 31. The upper portion 33 of second diameter section 32 is threaded, as is the upper portion 37 of third diameter section 36. Received within second diameter section 32 is the threaded fill screw 40 which has a nut-shaped head 42, thread 44, angled or cone-shaped end surface 46, and longitudinal opening 48 which communicates with orthogonally disposed radial opening 50. Fill screw 40 is also made of the same aluminum composition as that of the housing 12. Disposed at a corner 13 between third diameter section 36 and shoulder 34 is an O-ring 60. 0-ring 60 is compressed between the corner 13 of housing 12 and an angled or sloped surface 72 of cap screw 70. Cap screw 70 comprises end opening 78, threaded portion 71, angled portion 72, recess 74, radial end 75, and longitudinally extending annular ridge 77. End opening 78 is shaped for receiving a tool which can rotate cap screw 70. Cap screw 70 has threads 71 threadably engaging threads 37 in order to secure the cap screw within third diameter section 36. Bolt head 42 of fill screw 40 is received within recess 74 of cap screw 70. When cap screw 70 is threaded into position within third diameter section 36, the annular ridge 77 engages and bites into the radial shoulder 34 in order to provide a seal therebetween.

Pressure vessel 10 is charged with gas under pressure by the following procedure. First, the fill screw 40 is threaded within second diameter section 32, the fill screw remaining loosely threaded so that angled or cone-shaped surface 46 does not engage seat 31. A charging fixture is inserted within third diameter section 36 so as to engage and fit about bolt head 42. Gas under pressure, typically nitrogen, is pumped through the charging fixture to and through longitudinal opening 48 and radial opening 50 of fill screw 40, the gas exiting radial opening 50 and proceding past surface 46 and seat 31, through first diameter section 28 and into chamber 20. When an appropriate pressure has been attained in chamber 20, the charging fixture is rotated to advance longitudinally the fill screw until cone-shaped surface 46 sealingly engages seat 31 to trap the gas under pressure within chamber 20. The charging fixture is removed, 0-ring 60 placed within third diameter section 36, and cap screw 70 threadedly inserted. When cap screw 70 is tightened into place, it compresses O-ring 60 between corner 13 of housing 12 and angled portion 72, and also forces annular ridge 77 into penetrating engagement with shoulder 34 to effect a seal therebetween.

The present invention provides a superior multiple seal for maintaining gas under pressure within chamber 20 of vessel 10. Because fill screw 40 and housing 12 are made of the same material, i.e., aluminum, they have the same coefficient of expansion and contraction, and thus the seat load at seat 31 is maintained despite temperature fluctuations and the integrity of the seal is maintained. As additional backup seals, ridge 77 penetrates into and effects a seal between the housing 12 and cap screw 70, and 0-ring 60 provides sealing between cap screw 70 and housing 12. The present invention provides three different seals for maintaining gas under pressure within the chamber of the housing, the seals withstanding the variables of tolerance, time, and temperature. The seal effected has proved to be of high quality and integrity after being subjected to a variety of tests typically applied for automotive components, such as time, heat, salt spray, etc.

Although the present invention has been illustrated and described in connection with an example embodiment, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

I claim:

1. A pressure vessel comprising a body having therein a bore, a medium under pressure contained within the bore, the body having an opening for the transmission of the medium therethrough, the opening having a stepped diameter comprising first, second, and third diameter sections, a first shoulder between the first and second diameter sections forming a seat, a fill screw received within the second diameter section and extending to the first diameter section, the screw having an opening therethrough for transmission of said medium and an angled head which sealably engages the seat, a sealing ring disposed internally of the body to be within the third diameter section and biased into engagement with the body by a cap screw threadably received within the third diameter section and surrounded by the third diameter section, the cap screw enclosed by the opening of the body, the cap screw extending into engagement with a second shoulder (comprising a flat surface) disposed between the second and third diameter sections, the cap screw having at an end thereof an annular rib which enters into and engages sealingly the flat surface of the second shoulder to prevent escape of said medium from the bore.

2. The pressure vessel in accordance with claim 1, wherein the angled head of the fill screw comprises a cone-shaped surface which engages sealingly the seat.

3. The pressure vessel in accordance with claim 2, wherein the fill screw and body are both made of aluminum and have the same coefficient of expansion.

4. The pressure vessel in accordance with claim 2, wherein the medium comprises nitrogen under pressure.

5. The pressure vessel in accordance with claim 2, wherein the opening in the fill screw comprises a longitudinal opening and a radial opening disposed perpendicularly relative to one another and communicating with one another to provide for the transmission of said medium.

6. The pressure vessel in accordance with claim 1, wherein the cap screw includes a recess in said end and which receives therein a portion of the fill screw.

7. The pressure vessel in accordane with claim 6, wherein the portion of the fill screw comprises a bolt head.

8. The pressure vessel in accordance with claim 6, wherein the cap screw has a screw opening at an opposite end thereof for insertion of a tool.

9. The pressure vessel in accordance with claim 1, wherein the pressure vessel comprises an accumulator having a piston disposed within the bore, the piston having nitrogen under pressure on one side thereof adjacent the opening and having a fluid disposed on the other side of the piston.

10. The pressure vessel in accordance with claim 9, wherein the sealing ring is biased into engagement with a corner located between the second shoulder and third diameter section.

11. The pressure vessel in accordance with claim 10, wherein the cap screw includes an angled surface which engages the sealing ring.

12. A pressure vessel comprising a body having a bore therein, a medium under pressure contained within the bore, the body having an opening for the transmission of the medium therethrough, the opening having a stepped diameter, characterized in that the stepped diameter comprises first, second, and third diameter sections within the body, a first shoulder between the first and second diameter sections forming a seat, a fill screw received within the second diameter section and extending to the first diameter section, the screw having an opening therethrough for transmission of said medium into said second diameter section and a cone-shaped head which sealably engages the seat, a sealing ring disposed internally of the body to be within the third diameter section and biased into engagment with the body by a cap screw threadably received within the third diameter section and surrounded by the third diameter section, the cap screw enclosed by the opening of the body, the cap screw extending into engagement with a second shoulder comprising a planar surface disposed between the second and third diameter sections, the cap screw having at an end thereof an annular rib which engages sealingly and deforms the planar surface of the second shoulder to prevent escape of said medium from the bore.

* * * * *